US012720661B2

(12) United States Patent
McIntosh

(10) Patent No.: US 12,720,661 B2
(45) Date of Patent: Aug. 25, 2026

(54) LIGHTING EFFECT GENERATION AND CONTROL

(71) Applicant: John McIntosh, Birmingham (GB)

(72) Inventor: John McIntosh, Birmingham (GB)

( * ) Notice: Subject to any disclaimer, the term of this patent is extended or adjusted under 35 U.S.C. 154(b) by 0 days.

(21) Appl. No.: 18/833,252

(22) PCT Filed: Jan. 26, 2023

(86) PCT No.: PCT/GB2023/050172

§ 371 (c)(1),
(2) Date: Jul. 25, 2024

(87) PCT Pub. No.: WO2023/144539

PCT Pub. Date: Aug. 3, 2023

(65) Prior Publication Data

US 2025/0151186 A1 May 8, 2025

(30) Foreign Application Priority Data

Jan. 27, 2022 (GB) ..................................... 2201036

(51) Int. Cl.
*H05B 47/19* (2020.01)
*H05B 47/155* (2020.01)
(Continued)

(52) U.S. Cl.
CPC ........... *H05B 47/19* (2020.01); *H05B 47/155* (2020.01); *H05B 47/165* (2020.01);
(Continued)

(58) Field of Classification Search
None
See application file for complete search history.

(56) References Cited

U.S. PATENT DOCUMENTS

| | | | | |
|---|---|---|---|---|
| 7,870,504 | B1 * | 1/2011 | McIntosh | G06F 11/3698 715/740 |
| 8,499,038 | B1 * | 7/2013 | Vucurevich | G06Q 10/06 709/248 |

(Continued)

FOREIGN PATENT DOCUMENTS

| | | | |
|---|---|---|---|
| EP | 3852501 | A1 | 7/2021 |

OTHER PUBLICATIONS

Search Report from corresponding Great Britain Application No. GB2201036.7 dated Jul. 25, 2023.

(Continued)

*Primary Examiner* — Srinivas Sathiraju
(74) *Attorney, Agent, or Firm* — Caesar Rivise, PC

(57) ABSTRACT

A method of controlling a lighting effect generated by a plurality of participating devices, the plurality of participating devices each having a first side with a controllable light emission module and a second side having a participant input apparatus for a user of the device, the lighting effect being formed by a combination of light emissions from the light emission module of the devices. The method includes determining control of the light emission module of the devices such that between them they generate a lighting effect depending in nature on user inputs via the participant input apparatus of the devices, and controlling the light emission module in accordance with the determined control.

16 Claims, 3 Drawing Sheets

(51) Int. Cl.
*H05B 47/165* (2020.01)
*H05B 47/175* (2020.01)

(52) U.S. Cl.
CPC ..... *H05B 47/1965* (2024.01); *H05B 47/1985* (2024.01); *H05B 47/1975* (2024.01)

(56) References Cited

U.S. PATENT DOCUMENTS

| | | | | |
|---|---|---|---|---|
| 9,094,489 | B1 * | 7/2015 | Groenjes | H04W 4/18 |
| 9,131,551 | B2 * | 9/2015 | Hovey | H05B 47/155 |
| 9,141,276 | B2 * | 9/2015 | Dawes | G08B 13/22 |
| 9,306,809 | B2 * | 4/2016 | Dawes | G08B 25/10 |
| 9,349,276 | B2 * | 5/2016 | Cohn | G08B 25/007 |
| 9,369,677 | B2 * | 6/2016 | Jarvis | G01S 5/0264 |
| 9,371,099 | B2 * | 6/2016 | Lagassey | B62D 41/00 |
| 9,412,248 | B1 * | 8/2016 | Cohn | H04W 76/50 |
| 9,450,776 | B2 * | 9/2016 | Baum | H04L 67/025 |
| 9,596,574 | B1 * | 3/2017 | Groenjes | H04W 4/18 |
| 10,398,001 | B2 * | 8/2019 | Lee | H05B 45/20 |
| 10,932,344 | B2 * | 2/2021 | Shoop | G06F 13/105 |
| 10,945,316 | B2 * | 3/2021 | Lee | H05B 45/20 |
| 11,039,522 | B1 * | 6/2021 | Fields | H05B 47/199 |
| 11,570,869 | B1 * | 1/2023 | Chien | H05B 47/115 |
| 11,711,879 | B2 * | 7/2023 | Shoop | H04L 67/125 700/19 |
| 11,974,375 | B2 * | 4/2024 | Chien | H05B 47/11 |
| 11,991,807 | B2 * | 5/2024 | Lee | H05B 47/1985 |
| 12,402,227 | B2 * | 8/2025 | Shoop | H05B 47/165 |
| 2003/0017823 | A1 * | 1/2003 | Mager | H05B 47/19 455/566 |
| 2010/0110195 | A1 * | 5/2010 | McIntosh | H04N 21/21805 348/157 |
| 2013/0203036 | A1 * | 8/2013 | Jabara | H04W 4/80 434/350 |
| 2013/0328502 | A1 * | 12/2013 | Hovey | H05B 47/195 315/307 |
| 2013/0334967 | A1 * | 12/2013 | Wilcox | H05B 47/18 315/121 |
| 2014/0009366 | A1 * | 1/2014 | Chang | G09G 3/2092 345/1.1 |
| 2015/0189490 | A1 * | 7/2015 | Chan | G06F 3/1423 455/419 |
| 2018/0332684 | A1 * | 11/2018 | Lee | H05B 47/155 |
| 2018/0352636 | A1 * | 12/2018 | Engelen | H05B 47/19 |
| 2019/0196704 | A1 * | 6/2019 | Nakamura | G06F 3/0346 |
| 2019/0313509 | A1 * | 10/2019 | Slegers | H05B 47/115 |
| 2019/0342969 | A1 * | 11/2019 | Lee | H05B 45/20 |
| 2020/0112455 | A1 * | 4/2020 | Shoop | H04L 67/125 |
| 2020/0120458 | A1 * | 4/2020 | Aldana | H04W 28/22 |
| 2020/0294401 | A1 * | 9/2020 | Kerecsen | G08G 1/205 |
| 2021/0045220 | A1 * | 2/2021 | Barna | H05B 47/19 |
| 2021/0090151 | A1 * | 3/2021 | Bergman | H05B 47/19 |
| 2021/0160980 | A1 * | 5/2021 | Lee | H05B 47/155 |
| 2021/0176844 | A1 * | 6/2021 | Olaleye | H05B 47/155 |
| 2021/0235564 | A1 * | 7/2021 | Shoop | A63J 5/02 |
| 2023/0171865 | A1 * | 6/2023 | Chien | H05B 47/115 315/152 |
| 2023/0276555 | A1 * | 8/2023 | Lee | H05B 47/1985 315/291 |
| 2023/0328864 | A1 * | 10/2023 | Shoop | H03G 3/3005 700/19 |
| 2024/0284571 | A1 * | 8/2024 | Chien | H05B 47/115 |
| 2025/0151186 | A1 * | 5/2025 | McIntosh | H05B 47/165 |
| 2025/0203735 | A1 * | 6/2025 | Chen | H05B 47/125 |
| 2025/0318032 | A1 * | 10/2025 | Lin | H05B 47/155 |

OTHER PUBLICATIONS

Search Report from corresponding Great Britain Application No. GB2011950.9 dated Jan. 29, 2021.

International Search Report from corresponding PCT Application No. PCT/GB2023/050172 dated Apr. 11, 2023.

* cited by examiner

LIGHTING EFFECT GENERATION AND CONTROL

CROSS-REFERENCE TO RELATED APPLICATIONS

This application is a U.S. National Phase Application of PCT/GB2023/050172, filed Jan. 26, 2023, which claims priority to GB 2201036.7, filed Jan. 27, 2022, the contents of which are incorporated herein by reference in its entireties for all purposes.

TECHNICAL FIELD

The present disclosure relates to lighting effect generation and control. Aspects of the invention relate to a method of controlling a lighting effect, a controller means arranged to control a lighting effect and a method of such a controller means, a device and a method of such a device, computer programs, non-transitory computer storage mediums and signals.

BACKGROUND

It is known for users of electronic devices (such as mobile phones) to generate mass lighting effects through the combined light output from lights or display screens of their devices (e.g. in an arena such as a stadium). Typically, each user will hold-up their device with an illuminated light emission means facing outwards (i.e. away from themselves) to facilitate better viewing by others in the vicinity and creation of a collective lighting effect. The users may also move the device around to alter the effect. Nonetheless, coordination and sophistication of the overall lighting effect obtained is limited. Additionally, there is little or no opportunity for user's to have substantive input into the nature of the lighting effect e.g. what is displayed and/or how the development of the lighting effect over time proceeds. This limits possible applications for the lighting effect.

It is an object of embodiments of the invention to at least mitigate one or more of the problems of the prior art.

SUMMARY OF THE INVENTION

According to a first aspect of the invention there is provided a method of controlling a lighting effect generated by a plurality of participating devices, the plurality of participating devices each having a first side with a controllable light emission means and a second side having a participant input means (or participant inputter) for a user of the device, the lighting effect being formed by a combination of light emissions from the light emission means (or light emitter or emitters) of the devices, the method comprising:

i) determining control of the light emission means (or light emitter or emitters) of the devices such that between them they generate a lighting effect depending in nature on user inputs via the participant input means (or participant inputter) of the devices;
ii) controlling the light emission means (or light emitter or emitters) in accordance with the determined control.

The first aspect may allow generation of a lighting effect visible by multiple/all users whilst at the same time allowing each user to influence the lighting effect by inputting data via their respective participant input means (or participant inputter). Specifically, the same device may therefore be used to both contribute to the lighting effect and influence the nature of that lighting effect. The lighting effect may for example be textual, (e.g. a letter, number, symbol, word or sentence) a graphic, a shape, a pattern, an image, a video or may take another form. Variation in the nature of the lighting effect as controlled by the user inputs to the respective participant input means (or participant inputter) might for example comprise variations in the information content of at least part of the lighting effect (e.g. the words, picture, video displayed) and/or how long at least part of the lighting effect persists and/or the brightness/intensity of at least part of the lighting effect and/or the rate of progression of at least part of the lighting effect and/or a development/outcome of at least part of the lighting effect.

In some embodiments the first and second sides of each participating device are opposite sides of that device. It may be for instance that the first side is the back of the device and the second side is the front of the device. This may allow the first side to face away from the user (e.g. outwards) and therefore allow the light emission means (or light emitter or emitters) to better contribute to the lighting effect to be viewed by others (e.g. the users of the other participating devices and/or others present), whilst the second side faces the user of the device to better facilitate ease of making inputs via the participant input means (or participant inputter).

In some embodiments the participating devices are at least one of:

i) within a pre-defined geographical area;
ii) are associated with users attending a common event;
iii) have been enrolled as participating devices;
iv) have a particular application installed thereon;
v) have a particular application running and/or activated thereon; and
vi) are associated with a user who has indicated willingness to participate.

In this manner only devices for which there is at least a reasonable prospect of their respective light emission means (or light emitter or emitters) substantively contributing to the lighting effect may participate in the method. Further, in this manner, only devices the users of which are reasonably likely to be in a position to view the lighting effect and therefore being more likely to have an interest in influencing that lighting effect may participate in the method.

In some embodiments the determining control of the light emission means (or light emitter or emitters) of the devices is further performed such that the generated lighting effect depends in nature on the number of devices. It may be for instance that more complex lighting effects are possible with higher numbers of devices. Thus it may be for instance that where there are a relatively low number of devices, the lighting effect may be better limited to coordinated or sequential bursts of light emission, whereas a higher number of devices may allow lighting effects in the form of images or video to be generated.

In some embodiments the method comprises using geographical location data for the devices to generate the lighting effect in a form dependent on the geographical locations of the devices for its generation. This may allow lighting effects of greater coordination and sophistication to be generated. It may be for instance that the lighting effect comprises a pattern or a non-uniform image, graphic or other effect. In this case, each light emission means (or light emitter or emitters) may be considered a pixel available for use in generating the lighting effect, and knowledge of the geographical location of such pixels may be necessary in order to faithfully reproduce the lighting effect.

In some embodiments the determining control of the light emission means (or light emitter or emitters) is performed in accordance with geographic location data for the devices. It may be for instance that light emission means (or light emitter or emitters) of different of the devices may be instructed independently to emit light at a particular time or times and/or for a particular duration or durations and/or of a particular colour and/or colours and/or with particular intensity or intensities etc. As will be appreciated, these instructions may be the same or different for some or all of the devices.

In some embodiments the geographical location data comprises at least one of:

i) global positioning system data;
ii) signal strength data;
iii) assigned area and/or position;
iv) indication of proximity to and/or being within a predetermined area and/or position of known geographic location; and
v) sensor data.

By way of example, it may be the GPS data is used to determine the geographic location of one or more devices. By way of further example, signal strength may be taken to be indicative of distance from a transmitting beacon and therefore to provide geographic location data. It may be that multiple beacons are used, with signal strength for each being known, in which case greater geographic location accuracy may be achieved by combining the signal strength data. By way of further example, it may be that a user of a particular one of the devices has been assigned a particular seat of known geographical location and this is associated with the device. By way of further example, particular known geographical locations may each have associated therewith an image or apparatus which uniquely identifies the geographic location and optionally is scannable by the devices (e.g. a barcode, QR code or RFID tag) whereupon the device may communicate its corresponding geographic location. By way of a further example, one or more light detection sensors may be used to determine the geographic location of light emissions as the devices are instructed to emit light from their light emission means (or light emitter or emitters) in turn during a calibration event.

In some embodiments each device provides data indicative of its own geographical location.

In some embodiments the determining control of the light emission means (or light emitter or emitters) of the devices is further performed such that the generated lighting effect depends in nature on the distribution of devices. It may be for instance that more immersive and/or consistent lighting effects are possible with more evenly distributed devices.

In some embodiments development of the lighting effect over time is at least partially predictable for a viewer based on an initial stage or stages of the lighting effect. It may be for instance that the lighting effect at least substantially follows a pattern and/or a predictable chain of events, or is at least perceived as non-random. For instance, it may be that the lighting effect is progressive or cascading e.g. depicting or representing the movement of a roulette ball. In this way the potential for influencing the lighting effect by means of user inputs to the participant input means (or participant inputter) may be more apparent (e.g. where those inputs can alter an otherwise predictable outcome). Additionally or alternatively the impact of such inputs may be more easily perceived.

In some embodiments the user inputs via the participant input means (or participant inputter) of the devices comprise user expressions of preference among multiple possible lighting effects for use as the generated lighting effect. It may be for instance that the participant input means (or participant inputter) presents the user with a choice, for instance between different image, graphic or textual representations to be used as the lighting effect and/or different durations over which the lighting effect may persist. The lighting effect generated might then for example be determined in accordance with the most popular choice and/or an average amongst preferences expressed and/or in accordance with another statistical determination.

In some embodiments the user inputs via the participant input means (or participant inputter) of the devices comprise data indicative of user inputs received whilst the lighting effect is being generated and the lighting effect is controlled in dependence on that data. By way of example, it might be that light intensity levels of the lighting effect may be increased during its generation in accordance with user expression of preference for increased intensity level by means of the participant input means (or participant inputter). By way of alternative example, the development/outcome of a lighting effect in the form of a video sequence might change in dependence on user inputs received whilst the video sequence is being generated.

In some embodiments the method comprises selecting a device from among the plurality of participating devices. In this manner attention may be directed to a particular device and/or user e.g. as a winner or loser or contestant in a game, or as an individual desiring or requiring attention (e.g. healthcare or security). The selected device may be the only device selected or may be part of a group of selected devices. In the later case, a further process (e.g. one or more further instances of the method of the first aspect) may be performed in order to select a single device in isolation.

In some embodiments the selected device is indicated by the lighting effect. It may be for instance that the lighting effect culminates with an indication of the selected device. For instance, at the culmination of the lighting effect, the light emission means (or light emitter or emitters) of the selected device may be illuminated in a manner so as to distinguish it from one or more of the other light emission means (or light emitter or emitters). This could comprise the relevant light emission means (or light emitter or emitters) remaining illuminated, or being illuminated in a distinguishing colour or style (e.g. flashing). The selected device may be a device belonging to/associated with a winning user.

In some embodiments the lighting effect comprises movement. At least part of the lighting effect may for instance be a video or simulated movement effect. The lighting effect could for instance depict or represent a ball rolling or wave travelling over/among the devices.

In some embodiments the movement of the lighting effect slows from an initial speed to zero speed.

In some embodiments the selected device corresponds to the position reached in accordance with the movement of the lighting effect when it has reached zero speed.

In some embodiments the method comprises controlling the rate of slowing of the movement in dependence on the user inputs via the participant input means (or participant inputter) of the devices. Thus it may be that the rate of slowing is moderated in accordance with the user inputs via the participant input means (or participant inputter) of the devices.

In some embodiments at least one of the participating devices is a personal electronic device. Thus the device may belong to the user, rather for instance than being a part of an installation in an arena.

In some embodiments at least one of the participating devices is a mobile electronic device. The participating device may for instance be a mobile phone, personal digital assistant, tablet.

In some embodiments the controllable light emission means (or light emitter or emitters) of at least one of the participating devices comprises at least one of:

i) a multifunction light;

ii) a notification light;

iii) a display screen;

It may be for instance that the light emission means (or light emitter or emitters) also serves as a camera flash and/or torch in accordance with control by corresponding software or that the light emission means (or light emitter or emitters) comprises a display screen such as a secondary or rear facing display screen or a part of a display screen of the device provided on multiple sides thereof. Where the light emission means (or light emitter or emitters) is a display screen or a part thereof, it may be a touch-screen. Utilising light emission means (or light emitter or emitters) (e.g. rear facing flash/torch light and/or rear facing display screen) available in existing devices such as mobile phones may allow existing commonly carried mobile electronic devices to be used in performing the method.

In some embodiments the participant input means (or participant inputter) of at least one of the participating devices comprises a display screen, which may be a main display screen of the device, or a part thereof. The display screen or part thereof may be a touch-screen.

In some embodiments the participant input means (or participant inputter) displays a user interface with which the user can interact to provide one or more of the participant inputs. By way of example, the display screen may display a virtual button, slider or other virtual control interface, which may be adjusted by suitable user touch, gesture and/or other interaction. Additionally or alternatively, the participant input means (or participant inputter) of at least one of the participating devices comprises a physical button, slider or other control interface.

In some embodiments the participant input means (or participant inputter) displays a representation of the lighting effect. This may be displayed in substantially real-time and to the extent that the lighting effect comprises movement, may indicate the progression of that movement. Such a feature may be of particular assistance where the lighting effect itself is somewhat sporadically or unsatisfactorily generated as a consequence of limited numbers and/or undesirable distribution of devices. This feature may also be particularly beneficial for users with increased focus on the participant input means (or participant inputter) of a device (e.g. when providing inputs) rather than directly on the lighting effect itself.

In some embodiments a degree of control over the nature of the lighting effect is dependent on the frequency of actuations of the participant input means (or participant inputter). Thus, it may be for example that a user has increased influence where they press a virtual or actual button more times within a given period.

In some embodiments each device has running thereon a computer program which manages device side elements of the process. This includes performance of any combination of and optionally all functionalities discussed in this disclosure which are capable of performance, in whole or in part, by a computer program. The computer program may for example be an application such as a mobile phone app and may for instance by available for download from an online application store of similar (E.g. App Store or Google Play). The computer program may present a user interface for receipt of the user inputs made using the participant input means (or participant inputter) and/or may collate and/or send such inputs. Additionally or alternatively the computer program may control the light emission means (or light emitter or emitters) in accordance with the determined control. Additionally or alternatively, the computer program may determine and/or provide geographic location data for the device. Additionally or alternatively, the computer program may perform some or all of the determining of the control of the light emission means (or light emitter or emitters) of the devices, though this activity may alternatively be performed at least in part by another program on the device, one or more other of the devices and/or by another entity such as a controller means. Especially in the case of a controller means this may be remote and optionally may perform at least some of the determining of the control of the light emission means (or light emitter or emitters) for all of the devices.

In some embodiments the method further comprises controlling a sound effect generated by the plurality of devices, the devices each having a sound emission means (or sound emitter or emitters), the sound effect being formed by the combination of sound emissions from the sound emission means (or sound emitter or emitters) of the devices, the method comprising determining control of the sound emission means (or sound emitter or emitters) of the devices such that between them they generate the sound effect depending in nature on the user inputs via the participant input means (or participant inputter) of the devices and controlling the sound emission means (or sound emitter or emitters) in accordance with the determined control. All disclosures made herein with respect to the lighting effect are also intended as disclosures applicable to the sound effect mutatis mutandis.

In some embodiments the method is performed in respect of the participating devices being present within an arena. The participating devices may for instance be devices of audience member users. The arena may for instance be an auditorium, a stadium, a theatre, an amphitheatre, a sports ground, pitch, court or rink, a concert venue an audience zone, an event space or other mass gathering location.

According to a second aspect of the invention there is provided a computer program that, when read by a computer, causes performance of the method of the first aspect.

According to a third aspect of the invention there is provided a non-transitory computer readable storage medium comprising computer readable instructions that, when read by a computer, cause performance of the method of the first aspect. The non-transitory computer readable storage medium may be, for example, a USB flash drive, a secure digital (SD) card, an optical disc (such as a compact disc (CD), a digital versatile disc (DVD) or a Blu-ray disc).

According to a fourth aspect of the invention there is provided a signal comprising computer readable instructions that, when read by a computer, cause performance of the method of the first aspect.

According to a fifth aspect of the invention there is provided a controller means (or controller) arranged to control a lighting effect generated by a plurality of participating devices, the plurality of participating devices each having a first side with a controllable light emission means (or light emitter or emitters) and a second side having a participant input means (or participant inputter) for a user of the device, the lighting effect being formed by a combination of light emissions from the light emission means (or light emitter or emitters) of the devices, the controller means (or controller) comprising:

i) input means (or inputter or input) for receiving data from the devices indicative of participant inputs to the participant input means (or participant inputter) of the devices;

ii) processing means (or processor) arranged to determine control of the light emission means (or light emitter or emitters) of the devices such that between them they generate a lighting effect depending in nature on the received data;

iii) output means (our outputter or output) for sending data indicative of the determined control to the devices.

The controller means (or controller)) may be remote from the devices and may for instance be a server.

In some embodiments the input means (or inputter or input) also receives data indicative of the geographical location of each of the plurality of devices. The processing means (or processor) may further use the geographical location data for the devices to generate the lighting effect in a form dependent on the geographical locations of the devices for its generation.

According to a sixth aspect of the invention there is provided a method of operating a controller means (or controller) arranged to control a lighting effect generated by plurality of participating devices, the plurality of participating devices each having a first side with a controllable light emission means (or light emitter or emitters) and a second side having a participant input means (or participant inputter) for a user of the device, the lighting effect being formed by a combination of light emissions from the light emission means (or light emitter or emitters) of the devices, the method comprising:

i) receiving data from the devices indicative of participant inputs to the participant input means (or participant inputter) of the devices;

ii) determining control of the light emission means (or light emitter or emitters) of the devices such that between them they generate a lighting effect depending in nature on the received data;

iii) sending data indicative of the determined control to the devices.

In some embodiments the method further comprises receiving data indicative of the geographical location of each of the plurality of devices. The method may further comprise using the geographical location data for the devices to generate the lighting effect in a form dependent on the geographical locations of the devices for its generation.

According to a seventh aspect of the invention there is provided a computer program that, when read by a computer, causes performance of the method of the sixth aspect.

According to an eighth aspect of the invention there is provided a non-transitory computer readable storage medium comprising computer readable instructions that, when read by a computer, cause performance of the method of the sixth aspect. The non-transitory computer readable storage medium may be, for example, a USB flash drive, a secure digital (SD) card, an optical disc (such as a compact disc (CD), a digital versatile disc (DVD) or a Blu-ray disc).

According to a ninth aspect of the invention there is provided a signal comprising computer readable instructions that, when read by a computer, cause performance of the method of the sixth aspect.

According to a tenth aspect of the invention there is provided a device having a first side with a controllable light emission means (or light emitter or emitters) and a second side having a participant input means (or participant inputter) for a user of the device, the device comprising:

i) output means (or outputter or output) for sending data indicative of inputs to the participant input means (or participant inputter) of the device to a controller means;

ii) input means (or inputter or input) for receiving data for controlling the light emission means (or light emitter or emitters) the data being indicative of determined control for the light emission means (or light emitter or emitters) and for light emission means (or light emitter or emitters) of other devices such that they generate a lighting effect depending in nature on the data indicative of inputs to the participant input means (or participant inputter) and data indicative of participant inputs to participant input means (or participant inputter) of the other devices, where the lighting effect is formed by a combination of light emissions from the light emission means (or light emitter or emitters) of the device and the other devices;

iii) processing means arranged to control the light emission means (or light emitter or emitters) in accordance with the determined control.

In some embodiments the output means (or outputter or output) also sends to the controller means data indicative of the geographical location of the device. The controller means (or controller) may further use the geographical location data for the device and geographical location data for the other devices to generate the lighting effect in a form dependent on the geographical locations of the devices for its generation.

According to an eleventh aspect of the invention there is provided a method of operating a device having a first side with a controllable light emission means (or light emitter or emitters) and a second side having a participant input means (or participant inputter) for a user of the device, the method comprising:

i) sending data indicative of inputs to the participant input means (or participant inputter) of the device to a controller means;

ii) receiving data for controlling the light emission means (or light emitter or emitters) the data being indicative of determined control for the light emission means (or light emitter or emitters) and for light emission means (or light emitter or emitters) of other devices such that they generate a lighting effect depending in nature on the data indicative of inputs to the participant input means (or participant inputter) and data indicative of participant inputs to participant input means (or participant inputter) of the other devices, where the lighting effect is formed by a combination of light emissions from the light emission means (or light emitter or emitters) of the device and the other devices;

iii) controlling the light emission means (or light emitter or emitters) in accordance with the determined control.

In some embodiments the method comprises sending to the controller means (or controller) data indicative of the geographical location of the device. The controller means may further use the geographical location data for the device and geographical location data for the other devices to generate the lighting effect in a form dependent on the geographical locations of the devices for its generation.

According to a twelfth aspect of the invention there is provided a computer program that, when read by a computer, causes performance of the method of the eleventh aspect.

According to a thirteenth aspect of the invention there is provided a non-transitory computer readable storage medium comprising computer readable instructions that, when read by a computer, cause performance of the method of the eleventh aspect. The non-transitory computer readable storage medium may be, for example, a USB flash drive, a secure digital (SD) card, an optical disc (such as a compact disc (CD), a digital versatile disc (DVD) or a Blu-ray disc).

According to a fourteenth aspect of the invention there is provided a signal comprising computer readable instructions that, when read by a computer, cause performance of the method of the eleventh aspect.

According to a fifteenth aspect of the invention there is provided a system comprising the controller means of the second aspect and the device of the tenth aspect. As will be appreciated, the system may comprise multiple examples of the device of the tenth aspect.

Where an input means is referenced in this specification, this may comprise one or more inputs to receive the relevant data. Each such input may for instance be arranged to receive any one of electromagnetic wave signals, electrical signals, mechanical signals, hydraulic signals, pneumatic signals etc. In particular, each input may comprise a communication device for receiving data via wireless communication or wired communication. Examples of wireless communication mechanisms which may be used include, radio signals, satellite signals, mobile telephone signals, Wireless Local Area Network Signals and Bluetooth signals.

Where an output means is referenced in this specification, this may comprise one or more outputs to send the relevant data. Each such output may for instance be arranged to send any one of electromagnetic wave signals, electrical signals, mechanical signals, hydraulic signals, pneumatic signals etc. In particular, each output may comprise a communication device for sending data via wireless communication or wired communication. Examples of wireless communication mechanisms which may be used include, radio signals, satellite signals, mobile telephone signals, Wireless Local Area Network Signals and Bluetooth signals.

Where a processing means is referenced in this specification, this may comprise one or more computer processors.

Any controller means described herein may suitably be or comprise a controller such as a control unit or computational device having one or more electronic processors. Thus there may be a single control unit or electronic controller or alternatively different functions of the controller may be embodied in, or hosted in, different control units or controllers. As used herein the term “controller” or “control unit” will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. This expressly includes combining embodiments and/or features of embodiments of one aspect with another aspect. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
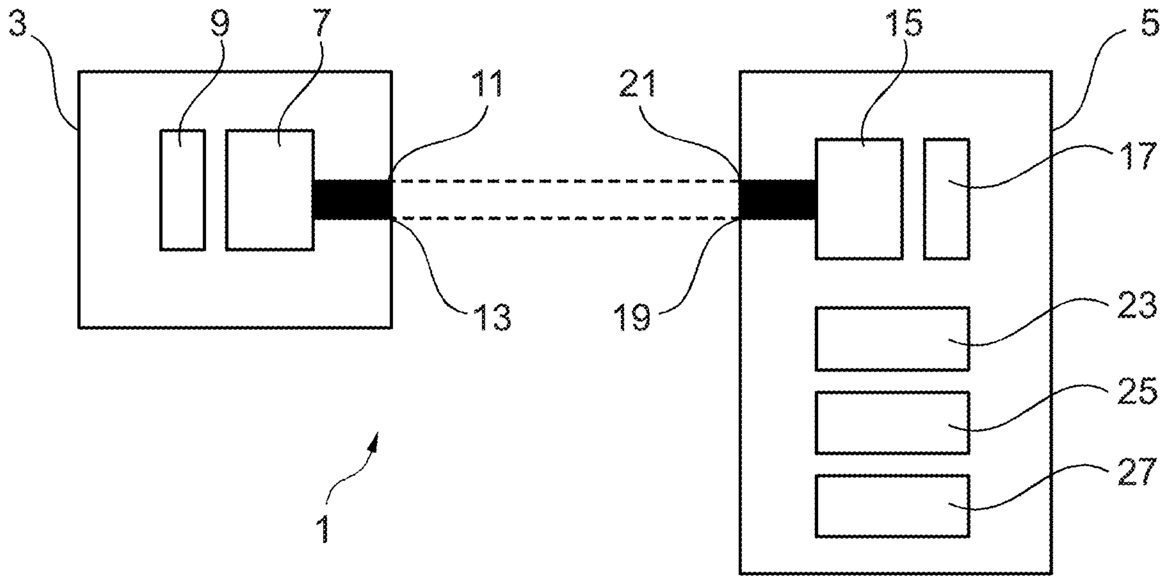
FIG. 1 shows a schematic representation of a system according to an embodiment of the invention.
Figure 2:
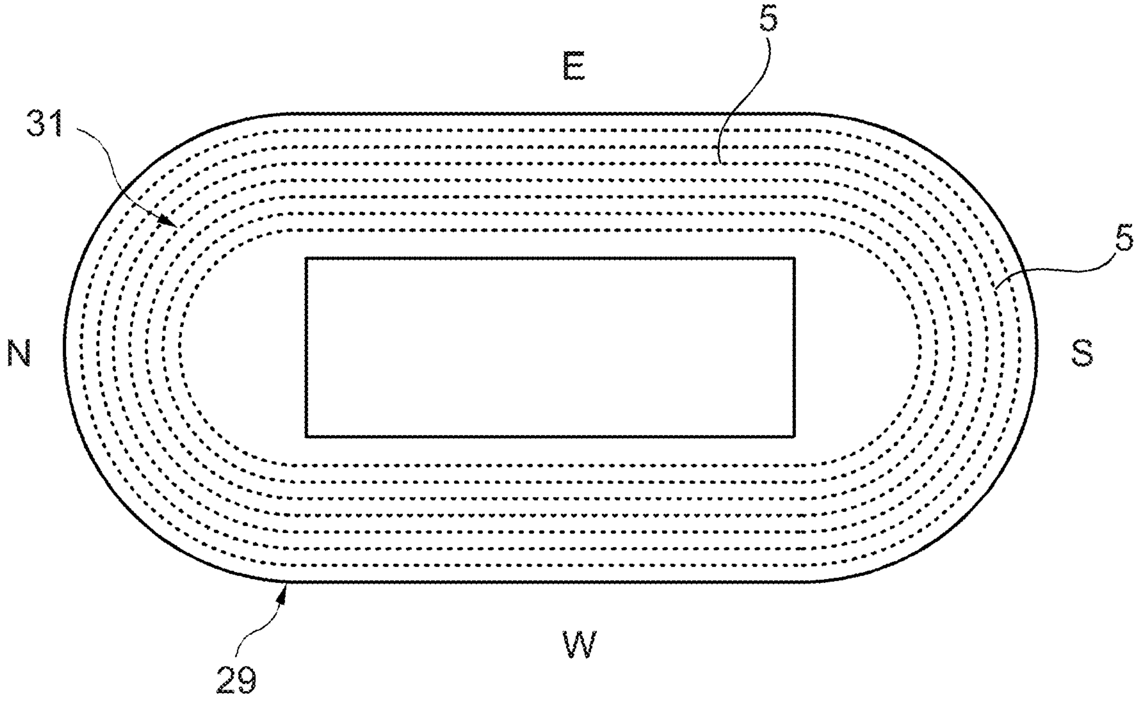
FIG. 2 shows participating electronic devices in a map in accordance with an embodiment of the invention.

Referring first to FIG. 1, a system is generally shown at 1. The system comprises a controller means (in this case a server 3), and a plurality of client electronic devices (in this case mobile phones 5) only one of which is shown for simplicity.

The server 3 comprises a processing means, (in this case processor 7) a memory 9, an input means, (in this case a wireless signal receiver 11) and an output means, (in this case a wireless signal transmitter 13).

Each mobile phone 5 comprises a processing means, (in this case processor 15) a memory 17, an input means, (in this case a wireless signal receiver 19) an output means, (in this case a wireless signal transmitter 21), a controllable light emission means, (in this case a multifunction light 23), participant input means, (in this case a touch main display screen 25) and a sound emission means, (in this case a speaker 27).

Hereinafter features of a single phone 5 are at times described for simplicity, but it should be understood that the description also applies to the other mobile phones 5.

The multifunction light 23 is located on a first side of the mobile phone 5, which is a back side thereof. The touch main display screen 25 is located on a second side of the mobile phone 5, which is a front side thereof and opposite the first side.

The mobile phone 5 has an application installed thereon stored in the memory 17. The application is configured to cooperate with a program stored in the memory 9 of the server 3 to allow generation of a lighting effect formed by a combination of light emissions from the multifunction lights 23 of the mobile phones 5. The application is further configured, in cooperation with the program stored in the memory 9 of the server 3, to allow a degree of mobile phone 5 user control over the lighting effect via one or more inputs on the touch main display screen 25.

In the present embodiment, the lighting effect simulates a game of roulette, showing the movement of a roulette ball about an arena (in this case a stadium 29) in which a football game is being played. This is intended purely for illustration however and as will be appreciated, in other embodiments, myriad other lighting effects are possible in the same or an alternative venue. For instance, the lighting effect could show video, e.g. of action recently witnessed, or an image of an emblem such as a flag or crest, or a static or moving picture character (e.g. celebrating or showing surprise, anticipation and/or despondency).

In use, the plurality of mobile phones 5 are participating mobile phones 5 in that they have the application installed thereon, have location tracking enabled, have been detected to be within the vicinity of the stadium 29 within a time period associated with the football game (e.g. while ticketed entry is permitted) and have indicating willingness to participate in the applications functions when prompted by a suitable question. Specifically, before the time period associated with the football game, the memory 9 of the server 3 is provided with data concerning a geographical perimeter of the stadium 29, a date and the time period associated with the football game, programmed image and video data for the roulette game, that the roulette game will be played and the time of the roulette game. The processor 7 of the server 3 sends this information to mobile phones having the application installed thereon via the wireless signal transmitter 13.

The explanation below proceeds with respect to one of the mobile phones which will prove to be a participating mobile phone 5, though as will be appreciated, some steps will also be performed by other of the mobile phones which do not ultimately prove to be participating mobile phones 5. The participating mobile phone 5 receives the data via its wireless signal receiver 19 and stores the data in its memory 17. The application, run by the processor 15 of the participating mobile phone 5, utilises the data as well as global positioning data periodically received by the participating mobile phone 5 from one or more satellites, to determine whether the participating mobile phone 5 is within a perimeter of the stadium 29 on the relevant date and at within the relevant time. Where this criterion is met, the application generates a query as to whether the user of the participating mobile phone 5 wishes to participate in the roulette game, and this is displayed on the touch main display screen 25 with options to accept and make a payment or to reject. Where the user accepts and pays through suitable interaction with the touch main display screen 25, and for as long as the application continues to detect that the participating mobile phone 5 is within the perimeter of the stadium 29 during the relevant time period, the participating mobile phone 5 is determined to be a participating mobile phone 5. As will be appreciated, variations on this methodology for identifying participating mobile phones 5 are also possible (e.g. based the ticket of a user being identified and accepted upon entry to the stadium 29).

At the appointed time of the roulette game, the server 3 requests geographical location data from each of the participating mobile devices 5 by sending a request via its wireless signal transmitter 13. The signal is received by the wireless signal receivers 19 of each of the participating mobile phones 5 and the application installed on each thereof accesses the global positioning data most recently received for its respective participating mobile phone 5, and transmits this to the wireless signal receiver 11 of the server 3 via the wireless signal transmitter 21 of the respective participating mobile phone 5.

Referring now to FIGS. 2-5, the received global positioning data is used by the processor 7 of the server 3 to generate a map 31 showing the location of the participating mobile phones 5 about the stadium 29. As consistent with FIG. 2, the global positioning data shows that the participating mobile phones 5 are arranged in locations so as to collectively create a series of concentric stadium shaped staged loops, with following loops being elevated with respect to preceding loops in a direction from inner to outer loops.

Figure 3:
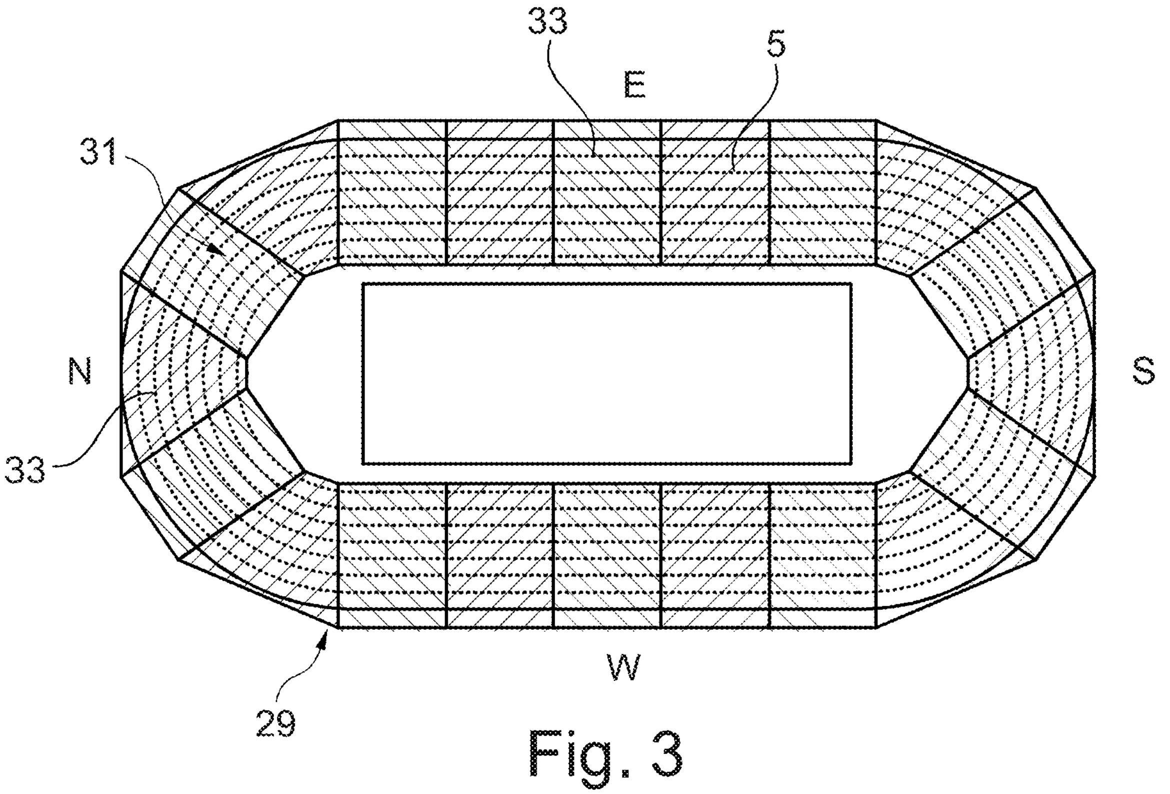
FIG. 3 shows a representation of a part of a lighting effect in accordance with an embodiment of the invention.

In order to generate the lighting effect of the roulette game, the processor 7 of the server 3 uses a ball image and a roulette table image stored in the memory 9 of the server 3. The ball image comprises a white ball and the roulette table image comprises alternating red and black bands around a stadium shaped loop consistent with the shape of the stadium 29. Throughout the game, the processor 7 of the server 3 controls the multifunction lights 23 of each of the participating mobile phones 5 to generate between them the roulette table image, with the stadium shape of the combined stadium shaped loops approximating the circle of a roulette table. The processor 7 of the server 3 overlays the roulette table image with the map 31. As will be appreciated, the part of the roulette table image that each multifunction light 23 will generate is dependent on the location of that multifunction light 23 within the stadium 29. The processor 7 of the server 3 uses the map 31 (i.e. the global positioning data for each of the participating mobile phones 5) with overlaid roulette table image, to determine a group 33 into which each participating mobile phone 5 (and therefore multifunction light 23) falls. Each group 33 corresponds to one of the colour bands (i.e. one of the red and black bands) and the group 33 into which a participating mobile phone 5 falls is the colour band overlaying its position on the map 31. The group 33 into which the participating mobile phone 5 falls determines the colour that its multifunction light 23 will be instructed to display by default. The processor 7 of the server 3 controls the colour of illumination of each multifunction light 23 at any given time accordingly by sending signals via the wireless signal transmitter 13 to the respective wireless signal receivers 19. The application of each of the participating mobile phones 5 then controls the respective multifunction light 23 accordingly. An illustration consistent with generation of the roulette table image is shown in FIG. 3.

Additionally, the processor 7 of the server 3 controls the multifunction lights 23 of each of the participating mobile phones 5 to generate the ball image depicted as if rolling around the combined stadium shaped loops in a clockwise manner (though anti-clockwise would also be possible). This part of the lighting effect is therefore generated as if moving, and takes the form of a video sequence. As the simulated passage of the ball temporarily overlaps a particular plurality of the participating mobile phones 5, the colour generated by its multifunction light 23 is changed from the default red or black associated with the relevant group 33, to white. Once the ball image has passed, the colour generated is returned to the default red or black associated with the relevant group 33. This gives the impression of the ball image rolling on top of the roulette table image. The starting position of the ball at the beginning of the game can be arbitrarily selected, though for the sake of explanation, in this embodiment it begins at the north end of the stadium. The processor 7 of the server 3 controls the video sequence of the rolling ball to complete multiple laps of the stadium shaped loops, slowing progressively from an initial speed to a zero speed (i.e. to a stop). The ultimate stopping location of the ball selects one of the groups 33 of the participating mobile phones 5, the selected group 33 corresponding to that overlaid by the ball when its speed is zero. Further selection from amongst that group 33 to determine a winner is discussed further below.

With the necessary fundamental determinations for control of the multifunction lights 23 made, the processor 7 of the server 3 initiates the roulette game and sends a signal via the wireless signal transmitter 13 and respective wireless signal receivers 19 to the application on each of the participating mobile phones 5 notifying game commencement and requesting display of a notification. This signal prompts the applications to display on the touch main display screen 25 of each device a notification encouraging users to raise the participating mobile phones 5 with the multifunction light 23 facing outwards, in order that their participating mobile phone 5 might best contribute to the generation of the lighting effect.

An additional element to the roulette game lighting effect is a degree of control that may be exerted by users of the participating mobile phones 5 over the rate of slowing of the ball. It will be appreciated that the development of the lighting effect in terms of the movement of the roulette ball is at least partially predictable. In particular, especially as the roulette ball has slowed significantly such that it may complete only a small number of additional laps or may not complete another full lap, the user's of the participating mobile devices viewing the generated lighting effect may be able to (or feel they are able to) predict a location of the roulette ball at a time when it reaches zero speed. A user may therefore feel that with control of the rate of slowing of the roulette ball, he/she might be able to increase the likelihood of their group 33 being selected. The system 1 provides this facility in that the rate at which the speed of the roulette ball decreases is dependent on inputs of the user's on the touch main display screens 25 of their participating mobile phones 5. The user's are therefore somewhat in control over the development and outcome of the roulette game and therefore the nature of the lighting effect.

The user control element of the roulette game is implemented by the application of each participating mobile phone 5 displaying on the respective touch main display screen 25 of the relevant participating mobile phone 5 a user interface comprising a virtual button. This user interface is displayed at the point of initiation of the roulette game and persists until the roulette ball has reached a speed of zero and a group 33 has been consequently selected. The user interface also indicates that by actuating the virtual button (i.e. by tapping it on the touch screen), the roulette ball is slowed more quickly. Thus, be actuating the virtual button an increased number of times per given time period whilst the roulette game is being played (i.e. whilst the lighting effect is being generated), a user may slow the ball more quickly than it would otherwise slow in accordance with a default slowing.

Each actuation of each virtual button is recorded by the application of the relevant participating mobile phone 5 and a signal indicating actuations within pre-determined regular time periods is sent from each mobile phone 5 via respective wireless signal transmitters 21 to the memory 9 of the server 3 via its wireless signal receiver 11. The processor 7 of the server 3 uses this data to determine the total number of user inputs via all of the virtual buttons in substantially real-time and bins the data into time periods. The processor 7 of the server 3 adjusts a default slowing rate applied to the roulette ball in accordance with a simulated braking force, the degree of which during any given time period is proportional to the total number of virtual button actuations in the binned time period immediately preceding the time period into which inputs occurring in the present time period will be binned. The processor 7 of the server 3 adjusts its control of the roulette game (i.e. the lighting instructions sent to the multifunction lights 23) accordingly. As will be appreciated, various alternative and/or additional mechanisms for controlling the rate of slowing of movement in dependence on the user inputs will also be apparent to the person skilled in the art including the use of smoothing as appropriate.

As will be appreciated, the adjustment possible in the progression and outcome of the roulette game in accordance with the inputs of the user's of the participating devices 5 represents one example of a way in which the nature of a lighting effect (in this case a roulette game) is made dependent on those inputs.

Whilst the roulette game is running, the user interface comprising the virtual button displayed on each touch main display screen 25 also shows a representation of the lighting effect, and in particular the position and progress of the roulette ball around the combined stadium shaped loops. Viewing this may be preferred by a user to viewing the actual lighting effect and/or may assist the user in understanding the state of the roulette game.

As the lighting effect of the roulette game is generated, a complimentary sound effect is generated in a similar manner using the speakers 27 of each of the participating mobile phones 5. The sound effect generated may assist user's of the mobile phones 5 in perceiving the speed of the roulette ball and/or the rate of its slowing. The sound effect comprises a whistling sound that alters in pitch in a continuous manner from higher to lower as the roulette ball slows. The speakers 27 are controlled via signals sent from the processor 7 of the server 3 via the wireless signal transmitter 13 of the server 3 to the wireless signal receivers 19 of the participating mobile phones 5. The rate of pitch change mirrors the rate of slowing of the roulette ball and is determined in the same manner as the slowing of the roulette ball.

Figure 4:
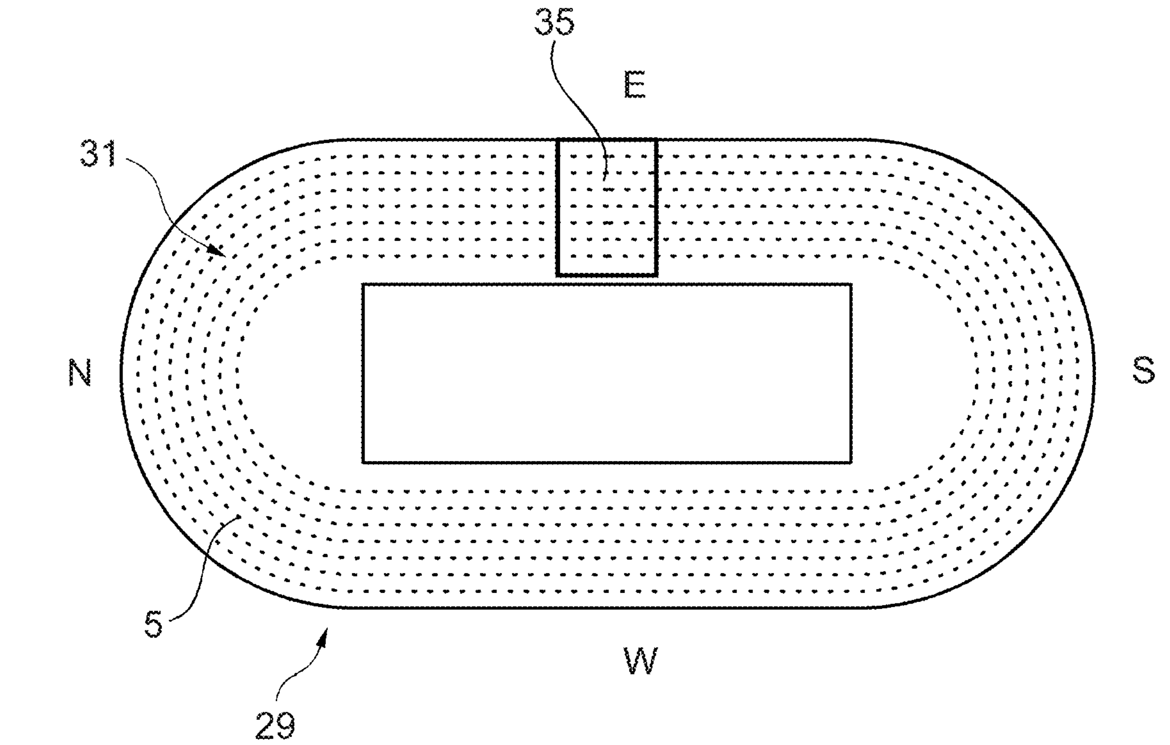
FIG. 4 shows a representation of a part of a lighting effect in accordance with an embodiment of the invention.
Figure 5:
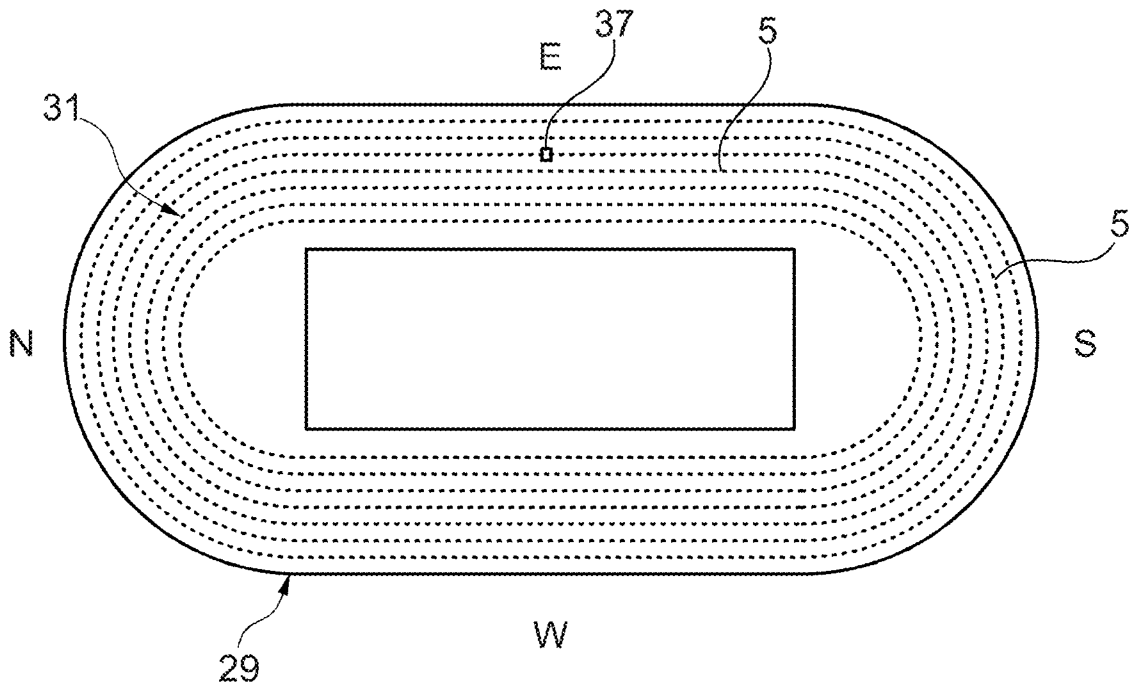
FIG. 5 shows a representation of a part of a lighting effect in accordance with an embodiment of the invention.

FIG. 4 shows a state of the roulette game in which one 35 of the groups 33, corresponding to the location of the roulette ball once it has reached zero speed, has been selected. The roulette game is then repeated in the manner substantially described above, but only between users of participating devices 5 within the selected group 35. In this round, the roulette ball is represented by illumination with a white light of individual multifunction lights 23. The ball thus displayed moves positionally sequentially through the multifunction lights 23 of the participating mobile phones 5 within the selected group 35, cycling though so as to be displayed by each of these participating mobile phones 5 on multiple occasions. Limited control of the rate of slowing of the roulette ball's progress is possible as before, but with only the user's of participating mobile phones 5 in the selected group 35 being offered the option of such control. When the speed of the roulette ball has reached zero speed, the illuminated multifunction light 23 indicates a selected participating mobile phone 37 and in this case the winner of the roulette game. The application of the selected participating mobile phone 37 is instructed to generate a red light to further highlight its selection, by means of signal sent by the processor 7 of the server 3 via the wireless signal transmitter 13 of the server 3 and wireless signal receiver 19 of the selected participating mobile device 37 (see FIG. 5).

As will be appreciated, in other embodiments this additional stage of the roulette game may be omitted and an individual user may instead be selected in accordance with the outcome of the original roulette game.

The embodiment so implemented may allow user's of the participating mobile phones 5 to both participate in controlling of the lighting effect using a participant input means (the touch main display screen 25) facing them, whilst at the same time participate in generating the lighting effect by means of controllable light emission means (the multifunction light 23) facing away from them.

Many variations on and/or additions to the above, even within the context of a generated lighting effect corresponding to a roulette game, are possible. For instance, it may be that the time of the roulette game is not pre-determined or at least that it is activated at short notice via suitable input to the server 3. Such a variation might give greater flexibility in terms of the roulette game being played at an appropriate time during the football game (e.g. during a dead-ball situation, during an injury break or at the commencement of half-time). By way of further example, the lighting effect may be more sophisticated than that described (e.g. with variation in light intensities being instructed to create a shadow effect for the roulette ball). By way of further example, the generated lighting effect may depend in nature on the number and/or geographical distribution of participating devices (e.g. mobile phones). By way of further example the application may have additional functionality to that discussed above, e.g. allowing voting in advance of or during the generation of the lighting effect as to the nature of the lighting effect and/or a prize to be won for the selected participating device.

Variations or alternatives to the roulette game are of course also possible. By way of example, an elimination game may be played in a context other than roulette. For instance, rather than the multifunction lights 23 of each of the participating mobile phones 5 being controlled to generate between them the roulette table image, and travelling roulette ball, they may be controlled to flash at regular intervals, with the colour or colours of the flash indicating the game status of the relevant mobile phone 5. One or more eliminations may occur per flash cycle. As the game progresses, the multifunction lights 23 of more mobile phones 5 may be controlled to flash a colour or colours indicated their elimination (e.g. red and then black), rather than a colour indicating continued participation (e.g. blue). The game may culminate with a mobile phone 5 ultimately being selected by being the only device left that has not been eliminated in accordance with the light colour displayed by its multifunction light 23. During the game, mobile phones 5 may be grouped by geographic area/proximity and may flash the same colour at the same time (e.g. may be eliminated at the same time). In this case, a first phase of the game may culminate with selection of a group of mobile phones 5, with the game being repeated thereafter among the mobile phones 5 of the selected group to determine a single mobile phone 5 ultimately selected. The elimination of mobile phones may have a predictable and (to some extent) controllable element, which is influenced by the user inputs (e.g. mobile phones 5 with the fewest user inputs in a linked sub-division of time during the game are eliminated).

In some embodiments the invention may be used to display a stationary or moving message (textual, numerical, indicia etc), for example moving or stationary advertising, amongst plural devices at an event, the participant input means being usable to control or influence the message displayed by the plural devices and/or being usable to effect or change that which is displayed. In an embodiment the system may be operable to reward participants who allow access to their devices to display a message, for example by rewarding the participant (e.g. awarding prizes, or the chance of a prize) according to the amount any particular participant has interacted with respective participant input means.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method of controlling a lighting effect generated by a plurality of participating devices, the plurality of participating devices each having a first side with a controllable light emitter and a second side having a participant inputter for a user of the device, the lighting effect being formed by a combination of light emissions from the light emitters of the devices, the method comprising:

i. determining control of the light emitter of the devices such that between them they generate a lighting effect comprising movement depending in nature on user inputs via the participant inputter of the devices;

ii. controlling the light emitter in accordance with the determined control; and iii. selecting a device from among the plurality of participating devices, where the selected device corresponds to the position reached in accordance with movement of the lighting effect when it has reached zero speed having slowed from an initial speed.

2. The method according to claim 1 where the first and second sides of each participating device are opposite sides of that device.

3. The method according to claim 1 where the determining control of the light emitter is performed in accordance with geographic location data for the devices.

4. The method according to claim 1 where development of the lighting effect over time is at least partially predictable for a viewer based on an initial stage or stages of the lighting effect.

5. The method according to claim 1 where the user inputs via the participant inputter of the devices comprise data indicative of user inputs received whilst the lighting effect is being generated and the lighting effect is controlled in dependence on that data.

6. The method according to claim 1 where the selected device is indicated by the lighting effect.

7. The method according to claim 1 comprising controlling the rate of slowing of the movement from the initial speed to zero speed in dependence on the user inputs via the participant inputter of the devices.

8. The method according to claim 1 where at least one of the participating devices is a mobile electronic device.

9. The method according to claim 1 where the controllable light emitter of at least one of the participating devices comprises at least one of:

iv. a multifunction light;

v. a notification light; and vi. a display screen.

10. The method according to claim 1 where the participant inputter displays a user interface with which the user can interact to provide one or more of the participant inputs.

11. The method according to claim 1 where a degree of control over the nature of the lighting effect is dependent on the frequency of actuations of the participant inputter.

12. The method according to claim 1 performed in respect of the participating devices being present within an arena.

13. The method according to claim 12, comprising causing the lighting effect to move around the arena from a first of said participating devices to a second successive of said participating devices and so on.

14. A controller arranged to control a lighting effect generated by a plurality of participating devices, the plurality of participating devices each having a first side with a controllable light emitter and a second side having a participant inputter for a user of the device, the lighting effect being formed by a combination of light emissions from the light emitter of the devices, the controller comprising:

i. inputter for receiving data from the devices indicative of participant inputs to the participant inputter of the devices;

ii. processor arranged to determine control of the light emitter of each device such that between them they generate a lighting effect depending in nature on the received data;

iii. outputter for sending data indicative of the determined control to the devices; and iv. selecting a device from among the plurality of participating devices, where the selected device corresponds to the position reached in accordance with movement of the lighting effect when it has reached zero speed having slowed from an initial speed.

15. A method of operating a device having a first side with a controllable light emitter and a second side having a participant inputter for a user of the device, the method comprising:

i. sending data indicative of inputs to the participant inputter of the device to a controller;

ii. receiving data for controlling the light emitter the data being indicative of determined control for the light emitter and for light emitter of other devices such that they generate a lighting effect depending in nature on the data indicative of inputs to the participant inputter and data indicative of participant inputs to participant inputter of the other devices, where the lighting effect is formed by a combination of light emissions from the light emitter of the device and the other devices;

iii. controlling the light emitter in accordance with the determined control; and vii selecting a device from among the plurality of participating devices, where the selected device corresponds to the position reached in accordance with movement of the lighting effect when it has reached zero speed having slowed from an initial speed.

16. The method according to claim 15, the method comprising operating second device having a first side with a controllable light emitter and a second side having a participant inputter for a user of the device, the method comprising:

i. sending data indicative of inputs to the participant inputter of the second device to a controller;

ii. receiving data for controlling the light emitter the data being indicative of determined control for the light emitter and for light emitter of the device and the second device such that they generate a lighting effect depending in nature on the data indicative of inputs to the participant inputter and data indicative of participant inputs to participant inputter of the other devices, where the lighting effect is formed by a combination of light emissions from the light emitter of the device and the second device;

iii. controlling the light emitter in accordance with the determined control.

* * * * *